Patented Apr. 2, 1940

2,195,529

UNITED STATES PATENT OFFICE 2,195,529

BITUMINOUS EMULSION

William H. Carmody, Pittsburgh, Pa., assignor to The Neville Company, Pittsburgh, Pa., a corporation of Pennsylvania No Drawing. Application September 1, 1937, Serial No. 161,965

16 Claims. (Cl. 134—1)

This invention relates to bituminous emulsions, more particularly to emulsions of coal tar and other products originating in pyrolitic treatment of coal, such as the high temperature by-product coking of coal.

Asphalt emulsions have been prepared for many years by procedures which are productive of an emulsion in which asphalt is the dispersed phase and water the continuous phase, being thus of the oil-in-water type. Asphaltic bitumen has a natural advantage in the production of such emulsions because its specific gravity closely approximates that of water, varying generally between 1.02 and 1.06, so that there is little tendency for coalescence of the asphalt particles with consequent destruction of the emulsion. By the addition of various emulsifying agents the density of the aqueous phase may be increased to approximate that of the bitumen, which largely eliminates the tendency for the bitumen to separate out during quiescent storage.

In the case of coal tar, however, there is no such natural advantage tending to confer stability upon aqueous emulsions because coal tar is substantially heavier than water, its specific gravity being generally from 1.15 to 1.25. Consequently in the case of tar-water emulsions of the oil-in-water type there is a considerable tendency for the coal tar to settle out.

It is among the objects of this invention to provide satisfactory emulsions of coal tar and other bitumens which are highly stable in the sense that separation does not occur during quiescent storage for extended periods of time, or that if separation does occur the emulsion can be reformed readily and rapidly by simple stirring, and which can be easily, cheaply and quickly made.

A special object is to provide emulsions of the type contemplated in which the tar constitutes the continuous phase and water the dispersed phase.

The invention is predicated upon my discovery that bituminous emulsions of the water-in-oil type may be made readily by means of a material known to the trade as "pure still residue," and that such emulsions possess various advantages important in the art, such as stability, little tendency to separation of the dispersed phase coupled with ease of reformation of the emulsion should separation occur, cheapness, and other important advantages to which reference will be made hereinafter.

The invention is applicable to a wide variety of bituminous materials, particularly those originating in pyrolitic treatment of coal, but it is particularly applicable to the production of coal tar emulsions, for which reason the invention will be described with particular reference thereto by way of illustration.

In the high temperature by-product coking of coal, for instance at temperatures between 1000° and 1300° C., the common practice is to scrub the gases coming off within a certain distillation range with a high boiling petroleum wash oil, to extract the aromatic oils contained in the gases. By such scrubbing the mineral oil becomes charged with solvents such as benzol, toluol, xylol, and naphthas, and these valuable constituents are subsequently volatilized away from the scrubbing, or wash, oil, and the mixture of these substances forms what is known as coke oven light oil. The light oil is then fractionated to obtain the individual constituents as somewhat impure cuts of rather narrow boiling range, and the crude fractions, or cuts, are usually subjected to acid purification followed by fractionation the purpose of which is to produce commerically pure solvents, and for this reason the stills used in the fractionating treatment are commonly termed "pure stills." The residues which remain in the stills are commonly designated in the trade as "pure still residues," and it is this product which is referred to herein by that term and which is used in the practice of the present invention.

"Pure still residues" may consist of residual matter left after the fractionation of the various cuts, such as those resulting from the production of motor benzol, pure benzol, toluol and xylol, or, and more commonly, it comprises a mixture of the residues from the various cuts. Ordinarily sufficient solvent is left in the residue to permit it being removed from the residue and handled in the liquid state.

Although not restricting myself thereto, I now prefer in the practice of the present invention to use the composite "pure still residue" resulting from the operations of the by-product coke plant of the Carnegie-Illinois Steel Company at Clairton, Pa., which material may be designated, for ease of reference, as Clairton "pure still residue."

The still residue is a dark viscous material of a syrupy consistency. Apparently it is a dispersed mixture of resins in oils, and of a colloidal nature. The Clairton "pure still residue" is highly sulfonated by virtue of the fact that the light oil from which it results is purified by washing with sulfuric acid. Likewise, it generally contains calcium or magnesium salts resulting from neutralization following acid purification. Furthermore, its resin content comprises a portion of low solubility in petroleum solvents that is substantially infusible, dark and opaque, and which contains various quantities of inorganic, or mineral, matter. The still residue contains another resinous portion of lighter color that is transparent and fusible, substantially free from inorganic matter, and of substantial solubility in petroleum solvents.

The use of "pure still residues" constitutes, in accordance with this invention, a cheap and efficient mode of preparing bituminous emulsions of particularly satisfactory character. The invention lends itself to the production of emulsions in a variety of ways, producing, as far as I have been able to determine, emulsions which are consistently of the water-in-oil type, i. e., in which the bitumen is the continuous phase. As contrasted with prior practice in the production of tar emulsions, those produced in the practice of this invention have the advantage of the mechanical resistance of the relatively viscous coal tar to separation of water, which is productive of emulsions of satisfactory commercial stability. In such a product the viscosity of the coal tar used largely controls the viscosity of the resultant emulsion, and, as far as I have been able to determine, the viscosity of the emulsion is somewhat greater than that of the coal tar from which it is made.

In the practice of the invention it is preferred to initially emulsify the still residue by the addition of water under dispersing conditions, such as by agitation or by other means known in the emulsion art, the resultant emulsion being then agitated with the bitumen which is to be emulsified. Or, if preferred, the still residue may be added, with agitation, to the bitumen, and water subsequently added under emulsifying conditions.

*Emulsification of still residue*

These procedures, and the variants in each, may be exemplified by examples taken from actual tests that have been made of the invention. For many, if not most, purposes it is most desirable first to emulsify the still residue. When agitated strongly with water the still residue forms a stable, viscous emulsion of the water-in-oil type, and rather large amounts of water may be held up in the emulsion. Thus, all proportions of water can be held in stable form by Clairton "pure still residue" up to about 4 parts of water per part of still residue. As water is added to the still residue in small portions with continuous mechanical agitation, emulsification proceeds with increase in viscosity of the emulsified mass.

Emulsification of the still residue can be effected at relatively low temperatures but in general this is not desirable because the lower the temperature the more viscous is the emulsion. Ordinarily 15° C. is about as low a temperature as is practical because below that temperature the emulsion becomes so viscous that it can not be agitated satisfactorily. There is a marked decrease in the viscosity of the water-still residue emulsion with increase in temperature so that for most purposes it is desirable to effect the emulsification at a temperature above normal. For most purposes this may be done satisfactorily between about 50° and 75° C. At about 85° C. there is a tendency for water to be lost by evaporation, although such higher temperatures may be used if a condenser be provided.

The length of time during which the water and still residue mixture is agitated will vary with the rate of addition of water, the vigorousness of agitation, and the temperature, as will be understood by those skilled in the art.

In one test of the stability of the water-still residue emulsions, one such emulsion was made using 150 gm. of Clairton "pure still residue" and 600 cc. of water, i. e., a ratio of 4 parts of water to 1 part of still residue. The water was added gradually to the still residue which was initially at a temperature of 30° C., the temperature being raised progressively as the water was added. The mixture was stirred continuously with a mechanical stirrer. The following tabulation shows the operating conditions:

| Time, minutes | Temperature, °C. | Total vol. of water ml. |
| --- | --- | --- |
| 0 | 30 | 0 |
| 1 | 49 | 50 |
| 2 | 43 | 170 |
| 2½ | 42 | 250 |
| 4 | 50 | 320 |
| 6 | 50 | 400 |
| 9 | 53 | 500 |
| 11 | 59 | 570 |
| 12 | 59 | 600 |
| 16 | 72 | |
| 19 | 70 | |
| 33 | 71 | |
| 35 | 71 | |

This emulsion was still stable after having stood for fifty-six days.

*Emulsification of tar*

In the preferred practice of the invention an emulsion such as that just described is agitated with bitumen to produce the finished bitumen emulsion.

As exemplifying this, 70 parts of coal tar were heated to 40° C. and agitated violently with 30 parts of a still residue emulsion comprising 10 parts of still residue and 20 parts of water. The mixture was agitated for fifteen minutes, producing an emulsion of water in tar which did not show free water until it had stood for twelve days.

Such emulsions can be made using other proportions of tar and still residue emulsion, and in the latter the ratio of the still residue to water may be varied. However, with constant proportions of tar and still residue emulsion the stability is improved by the use of emulsions containing high ratios of still residue.

Another method of incorporating water in tar is to emulsify the latter by agitating it with a still residue emulsion containing, or diluted with, creosote oil. As exemplifying this practice of the invention, there was used an area No. 1 creosote oil, which is a coal tar distillate meeting certain specifications set up by the American Railway Engineering Association. 60 parts of this creosote oil were agitated with 40 parts of a still residue emulsion produced from 8 parts of "pure still residue" and 32 parts of water. The product was then added to coal tar in the proportion of 60 parts of tar to 40 parts of the creosote oil-still residue emulsion, and the mixture was agitated for twenty minutes at 40° C. After standing for 30 days only a few drops of water had separated from the emulsion.

As in other instances in the practice of the invention, the proportions of the ingredients may be varied but the stability of the final emulsion is increased, in general, by decrease in the water content, or by increase of the ratio of "pure still residue" to water.

Emulsions of good stability may be obtained also by emulsifying the tar with a still residue emulsion and adding a small amount of pure still residue itself directly to the tar. For instance, 67 parts of coal tar were agitated for twenty minutes at 60° C. with 30 parts of an emulsion made from 24 parts of water and 6 parts of "pure still residue." After such addition there were added 3 parts of "pure still residue" and the agitation was continued for five minutes more. At the end of twenty-two days no water had separated from the emulsion. The same results may be obtained by incorporating the excess of "pure still residue" in the tar prior to agitation with the still residue emulsion, and an advantage of this modified procedure is that the natural water content of the tar is apparently emulsified initially by the "pure still residue", which is followed by increased stability of the resultant emulsion.

Use of soap in tar emulsions

I have found also that particular advantages attend the use of soap in the initial emulsification of the still residue. When the "pure still residue" is agitated with a weak aqueous soap solution there is readily formed a dispersion of the oil-in-water type, although the ultimate bituminous emulsion obtained from this material is yet of the water-in-oil type, as in the preceding examples. The initial still residue emulsion of the oil-in-water type possesses properties which are radically different from those of emulsions produced from still residue and water alone, and which are of marked advantage. For instance, the dispersions of still residue made using soap are of markedly lower viscosity than those made without soap, consequently the power consumption during agitation is at a minimum. Also, the emulsification is completed more rapidly than where soap is not used. These soap-containing emulsions of still residue likewise blend readily with tar at lower temperatures than are practical with the viscous type of emulsions made without soap, it being possible to make the final tar emulsion at room temperature.

The soap content may vary but for many purposes from 0.5 to 2.0 parts of soap, based upon the final tar emulsion, suffice, the lower limits being generally preferred. The use of soap apparently does not disturb the relations which exist between the water and still residue, the still residue being able to hold as much as 4 parts of water per part of still residue whether or not soap be present. The tar content in the final emulsion may be as low as 50 parts in 100 parts of emulsion but if the tar is decreased below that value the stability is decreased irrespective of the content of still residue or of soap.

In this embodiment of the invention still residue may be agitated with an initially prepared soap solution and the resultant emulsion agitated with tar until a homogeneous emulsion is produced. Or the still residue and tar may be added simultaneously to the soap solution with constant agitation. Generally speaking, the order of addition is immaterial, i. e., the soap solution may be added to the pure still residue and tar, or vice versa.

In one test 50 parts of tar were agitated with an emulsion produced from 10 parts of "pure still residue", 38 parts of water and 2 parts of soap. After fifteen days' standing the emulsion showed no sign of separation. The same stability was produced in an emulsion prepared in the same way except that the soap was reduced to 0.5 part and the water correspondingly increased, showing how the soap content may be varied with maintenance of emulsion stability.

In another test 6 parts of pure still residue and 70 parts of tar were added to a soap solution made from 22.8 parts of water and 1.2 parts of soap. This emulsion showed no sign of separation after standing for sixteen days.

Tar emulsions prepared in this manner have been subjected to a temperature of minus 9° C. for one-half hour, followed by warming slowly to 25° C., without separation either during warming or after prolonged standing after warming.

Emulsification of other bitumens

The invention is applicable also to the emulsification of bitumens other than coal tar. For instance, emulsions containing creosote oil may be prepared in accordance with the invention. To illustrate, 60 parts of area No. 1 creosote were agitated for 5 minutes at 45° C. with 40 parts of a still residue emulsion made from 10 parts of "pure still residue" and 30 parts of water. The resultant emulsion did not show free water until after it had stood for 20 days.

These emulsions exhibit an important feature of the invention, namely, that when water does appear the homogeneity of the dispersion can be reestablished by simple hand stirring.

"Pure still residue" emulsion blends readily with asphaltic road oils, such as those of 60 per cent asphalt content, with production of adequately stable emulsions. These emulsions exhibit an increase in viscosity over that of the original road oil.

By actual experience it has been found that the invention is applicable to the emulsification of various other bitumens originating in the high temperatures coking of coal, with production of emulsions of greater or lesser stability but which are readily homogenized by shaking or simple stirring if separation occurs. For example, it has been applied to the emulsification of shingle oil, of the oily polymers, termed heavy oil, resulting from polymerization of the polymerizable constituents of crude solvent naphtha, of mixtures of heavy oil and polyindene resin, of heavy oil resulting from phenolic modification of polyindene resin during its production from crude solvent naphtha, and of other materials of related character.

In addition to the ease of production, cheapness, stability, and other advantages which will be recognized from the foregoing description, products made in accordance with the invention possess other advantages. Thus, referring to road use of such emulsions, they set up more quickly, due to more rapid volatilization of water, than the emulsions made according to prior methods using high boiling coal tar distillates. Similarly, the emulsions made in accordance with the present invention exhibit reduced flammability as compared with coal tar cut back with coal tar distillates. The emulsions are stable at sub-zero temperatures, which is obviously an important advantage.

Although reference has been made herein to the use of pure still residue in the practice of the invention, I have found that the emulsification is apparently due chiefly to a particular portion of the still residue. The still residue comprises, speaking generally, an oil portion and a resin portion. The oily portion appears alone to be incapable of emulsification, while the resin portion does exhibit properties as described herein. Through classification with petroleum solvents this resin portion may be separated into a fraction soluble in such solvents, and a fraction substantially insoluble therein, and it is in this latter that the emulsification property appears to reside chiefly. Accordingly, this portion of the residue, or of an equivalent resin, such as one of very high molecular weight, may be used as an emulsification agent, for the purpose of bituminous emulsions, and reference in the claims to still residue contemplates the use of such resinous material possessing the emulsifying properties described herein.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A stable bituminous emulsion comprising a dispersion of water, bitumen, and emulsifying agent comprising "pure still residue" resulting from the purification and fractionation of light oil derived from the by-product coking of coal, said emulsion containing said bitumen as the continuous phase and said water as the disperse phase.

2. A tar emulsion comprising tar, water, and emulsifying agent comprising "pure still residue" resulting from the purification and fractionation of light oil derived from the by-product coking of coal, said emulsion containing up to about four parts of water per part of still residue, and said water being dispersed in said tar.

3. A tar emulsion comprising tar, an aqueous soap solution containing up to about 2.0 per cent of soap based on the final emulsion, and emulsifying agent comprising "pure still residue" resulting from the purification and fractionation of light oil derived from the by-product coking of coal, said emulsion containing up to about four parts of water per part of still residue, and said water being dispersed in said tar.

4. The method of making a bituminous emulsion which comprises dispersing bitumen in the presence of water and, as an emulsifying agent, resin contained in "pure still residue" resulting from the purification and fractionation of light oil derived from the by-product coking of coal and thereby producing an emulsion of said bitumen as the continuous phase and said water as the dispersed phase.

5. The method of making a bituminous emulsion which comprises dispersing bitumen in the presence of water and, as an emulsifying agent, "pure still residue" resulting from the purification and fractionation of light oil derived from the by-product coking of coal and thereby producing an emulsion of said bitumen as the continuous phase and said water as the dispersed phase.

6. The method of making a bituminous emulsion which comprises dispersing bitumen in the presence of water, soap, and, as an emulsifying agent, "pure still residue" resulting from the purification and fractionation of light oil derived from the by-product coking of coal and thereby producing an emulsion of said bitumen as the continuous phase and said water as the dispersed phase.

7. The method of making a bituminous emulsion comprising emulsifying a mixture of water and "pure still residue" resulting from the purification and fractionation of light oil derived from the by-product coking of coal, and dispersing the bitumen to be emulsified with such emulsion of water and "pure still residue" whose "pure still residue" content acts as an emulsifying agent, and thereby producing an emulsion of said bitumen as the continuous phase and water as the dispersed phase.

8. A method in accordance with claim 7 in which the emulsion of water and "pure still residue" contains up to about four parts of water per part of said still residue.

9. The method of making bituminous emulsion comprising emulsifying a mixture of aqueous soap solution and "pure still residue" resulting from the purification and fractionation of light oil derived from the by-product coking of coal, and agitating the resultant emulsion with the bitumen to be emulsified, and thereby producing an emulsion in which said "pure still residue" acts as emulsifying agent, the bitumen is the continuous phase, and the water is the dispersed phase.

10. The method of making bituminous emulsion comprising emulsifying a mixture of creosote oil, water, and, as emulsifying agent, "pure still residue" resulting from the purification and fractionation of light oil derived from the by-product coking of coal, and agitating the resultant emulsion with the bitumen to be emulsified, and thereby producing an emulsion of said bitumen as the continuous phase and the water as the dispersed phase.

11. The method of making bituminous emulsion comprising emulsifying a mixture of creosote oil, an aqueous soap solution, and, as emulsifying agent, "pure still residue" resulting from the purification and fractionation of light oil derived from the by-product coking of coal, and agitating the resultant emulsion with the bitumen to be emulsified, and thereby producing an emulsion of said bitumen as the continuous phase and water as the dispersed phase.

12. The method of making bituminous emulsion comprising emulsifying a mixture of water and "pure still residue" resulting from the purification and fractionation of light oil derived from the by-product coking of coal, agitating the bitumen to be emulsified with a minor proportion of said "pure still residue," and agitating said bitumen with the emulsified mixture of water and "pure still residue" and thereby producing an emulsion of said bitumen as the continuous phase and water as the dispersed phase in which said "pure still residue" is an emulsifying agent.

13. The method of making tar emulsion comprising emulsifying a mixture of water and "pure still residue" resulting from the purification and fractionation of light oil derived from the by-product coking of coal, said emulsion containing up to about four parts of water per part of said still residue, and agitating the resultant emulsion with the tar to be emulsified and thereby producing an emulsion of said tar as the continuous phase and water as the dispersed phase in which said "pure still residue" is an emulsifying agent.

14. The method of making tar emulsion comprising emulsifying a mixture of an aqueous dilute soap solution and "pure still residue" resulting from the purification and fractionation of light oil derived from the by-product coking of coal, said emulsion containing up to about four parts of water per part of said still residue, and agitating the resultant emulsion with the tar to be emulsified and thereby producing an emulsion of said tar as the continuous phase and water as the dispersed phase in which said "pure still residue" is an emulsifying agent.

15. The method of making tar emulsion comprising mixing tar with a minor proportion of emulsifying agent comprising "pure still residue" resulting from the purification and fractionation of light oil derived from the by-product coking of coal, emulsifying a mixture of water and said still residue containing up to about four parts of water per part of still residue, and agitating the resultant emulsion with the aforesaid tar mixture and thereby producing an emulsion containing said tar as the continuous phase and water as the dispersed phase.

16. The method of making tar emulsion comprising emulsifying a mixture of water and, as emulsifying agent, "pure still residue" resulting from the purification and fractionation of light oil derived from the by-product coking of coal, said emulsion containing up to about four parts of water per part of still residue, and agitating the resultant emulsion with tar in an amount such as to provide at least about 50 per cent of tar in the final emulsion and thereby producing an emulsion containing said tar as the continuous phase and water as the dispersed phase.

WILLIAM H. CARMODY.